United States Patent
Shibata et al.

(10) Patent No.: US 6,830,436 B2
(45) Date of Patent: Dec. 14, 2004

(54) WIND TURBINE PROVIDED WITH NACELLE

(75) Inventors: Masaaki Shibata, Nagasaki (JP); Toyoaki Furukawa, Nagasaki (JP); Yoshiyuki Hayashi, Nagasaki (JP); Eiji Kato, Nagasaki (JP)

(73) Assignee: Mitsubishi Heavy Industries, Ltd., Tokyo (JP)

( * ) Notice: Subject to any disclaimer, the term of this patent is extended or adjusted under 35 U.S.C. 154(b) by 27 days.

(21) Appl. No.: 10/370,073

(22) Filed: Feb. 21, 2003

(65) Prior Publication Data
US 2003/0175121 A1 Sep. 18, 2003

(30) Foreign Application Priority Data

Feb. 22, 2002 (JP) ........................................ 2002-046192
Mar. 14, 2002 (JP) ........................................ 2002-069737

(51) Int. Cl.[7] ............................................. F04D 29/38
(52) U.S. Cl. ...................... 416/228; 416/232; 416/235
(58) Field of Search ................... 415/2.1, 4.5, 119; 416/228, 232, 235, 236 R

(56) References Cited

U.S. PATENT DOCUMENTS

| 4,540,333 | A | * | 9/1985 | Weisbrich | 415/4.3 |
| 5,088,665 | A | * | 2/1992 | Vijgen et al. | 244/200 |
| 5,499,904 | A | * | 3/1996 | Wallace et al. | 415/230 |
| 5,533,865 | A | * | 7/1996 | Dassen et al. | 416/228 |
| 5,873,699 | A | * | 2/1999 | Watson et al. | 415/200 |
| 6,004,102 | A | * | 12/1999 | Kuefner et al. | 416/228 |
| 6,733,240 | B2 | * | 5/2004 | Gliebe | 416/228 |

FOREIGN PATENT DOCUMENTS

| JP | 7-77211 | 3/1995 |
| JP | 7-332007 | 12/1995 |
| JP | 11-201021 | 7/1999 |

\* cited by examiner

*Primary Examiner*—Hoang Nguyen
(74) *Attorney, Agent, or Firm*—Armstrong, Kratz, Quintos, Hanson & Brooks, LLP

(57) ABSTRACT

The blade structure of a wind turbine which has enough strength for sporadic large load and increased durability. The blade can be formed into a thinner blade profile, with which blade performance is improved, increased efficiency of the wind turbine is attainable, and the noise induced by Karman vortex street is reduced. The blade is made of metal and formed into a one-piece blade or a split-type blade consisting of a main blade body made of metal and a rear end member made of metal other than that of the main blade body, the rear end member being fixed to the rear end of the main blade body, dentation being formed in the trailing edge part of the blade along the length thereof, the dentation being shaped in a serration of triangular teeth, of trapezoidal teeth, or of sawteeth, the ratio($h/\delta$) of the tooth height h to the thickness $\delta$ of the boundary layer developed on the surface of the blade is: $h/\delta=1.0\sim10.0$, and the ratio ($h/p$) of the tooth height h to the pitch p is: $h/p=0.5\sim5.0$.

14 Claims, 8 Drawing Sheets

11 Leading edge part
Cavity 14
Main blade body 20
Rear part member 16
13 Dentation
12 Trailing edge part Wind
1
Bolt 18
11
14  20
Main blade body
15 Jointing part
Rear part member 16
13
12

13 Dentation

13

3: Horizontal drive shaft

S: Air stream

WIND TURBINE PROVIDED WITH NACELLE

BACKGROUND OF THE INVENTION

1. Field of the Invention

The present invention relates to a wind turbine provided with a nacelle, in which dentation such as serration formed of triangular or trapezoidal teeth is formed in the trailing edge part of each of the blades of the turbine along the length of the blade.

2. Description of the Related Art

Up to now, wind turbine generator equipment having a large electric power generation capacity have been established at high elevations such as on hills and mountains or on the sea where high wind speed can be utilized, the equipment comprising a number of large wind turbine generating units, each wind turbine being provided with a nacelle and generating rotating force by the wind force acting on a plurality of blades attached to the rotor to drive an electric generator connected to the rotor.

An example of a horizontal-axis wind turbine provided with a nacelle will be explained with reference to FIGS. 12(A) and 12(B). As shown in the drawings, the wind turbine is mounted on the top of a tapered tube-like tower (support) 4 made of, for example, steel or concrete for revolution in a horizontal plane via a nacelle (box for accommodating apparatuses) 5, the horizontal drive shaft 3 of a rotor 2 having three blades 1 in front of the nacelle 5 is supported by the nacelle 5. The horizontal drive shaft 3 is connected to an electric generator(not shown in the drawing) via a speed increasing gearbox (not shown in the drawing) in the nacelle 5.

The diameter of the surface of revolution of the blades of a conventional large horizontal-axis wind turbine reaches nearly 45 m, and the wind turbine to which the present invention is applied can be composed to have the diameter of the surface of revolution of blade of 10 m to 100 m, not limited to nearly 45 m.

FIGS. 13(A), 13(B) and 13(C) show an example of the blade of prior art of a conventional wind turbine provided with a nacelle, when FIG. 13(A) is a partial perspective view, FIG. 13(B) is a sectional view, and FIG. 13(C) is an enlarged partially plan view of the trailing edge part of the blade.

Referring to FIG. 13(A), reference numeral 1 is a blade, 11 is the leading edge part, 12 is the trailing edge part, 1a is the upper chord surface, and 1b is the lower chord surface of the blade 1. As shown in FIG. 13(B), the sectional profile of the blade of the wind turbine is a streamlined one, a profile so-called an airfoil, which is tapered off to the rear edge (trailing edge) and less subjected to air resistance, and rotating force results from the lift F effected through the pressure difference arising from the difference between the velocities of air stream S on the lower chord surface 1b and upper chord surface 1a of the blade 1.

The blade 1 is made of FRP (fiber reinforced plastic) into a one-piece structure or may be made of porous resin such as foamed polypropylene (polybrene) in the case of a small size blade.

A wind turbine blade consisting of a main blade body part and a rear end part is proposed in Japanese Patent Application Publication 2000-120524, in which the rear end part is formed as a separate member and fixed to the main blade body, and the rear end member constituting the rear end part has a plurality of protrusions of triangular or sawtooth-like tooth formed along the length of the blade in its trailing edge part and extending toward the rear.

According to the disclosure, become the rear end member of the wind turbine blade is formed as a separate member and fixed to the main blade body, the rear end member can be worked separately, and the working thereof becomes easy as the handling of the whole of the large blade is not necessary.

The present invention is directed to forming the rear end member with such high precision that the thickness of the trailing edge can be reduced to a value such that the generation of Karman vortex street is suppressed, and further that vertices which interfere with the generation of the Karman vortex street are generated as a result of the protrusions of triangular or sawtooth-like teeth formed in the trailing edge part along the length of the trailing edge part of the separate rear end member and extending toward the rear, and, as a result, noise level is reduced.

By providing the protrusions of triangular or sawtooth-like teeth in the trailing edge part, the generation of Karman vortex street is suppressed compared with the case in which the trailing edge is straight.

Twisting moment about the longitudinal axis of the blade and bending moment act on the wind turbine blade as a result of its own weight and wind force as it rotates, and shearing and tensile stresses as a result of the moments are easy to concentrate in the leading edge and trailing edge. Particularly, the trailing edge part is liable to be fractured by stress concentration as the thickness thereof is necessary to be thin.

According to the present invention, the front end part and the rear end part of the blade are composed of a plurality of separate members respectively and each separate member can be deformed independently. With this composition, the concentration of stress is alleviated and fracture resulting from stress concentration is prevented.

In this prior art, the rear end part of the wind turbine blade having dentation of triangular or trapezoidal teeth formed in the trailing edge part is formed into a separate member or a plurality of separate members made of hard rubber which is tenacious than the FRP of the main blade body and fixed to the rear end of the main blade body.

When the thickness t of trailing edge part 12 is larger than a certain value, Karman vortex street 19 consisting of a couple of vortex sheets is developed downstream from the trailing edge, the vortex being generated periodically with a cycle proportional to wind speed, and the couple of vortex streets A, A1 proceed downstream to B, B1 as shown in FIG. 13(A). Noise with a frequency proportional to wind speed is generated caused by this phenomenon.

In the case of the blade 1 made of FRP shown in FIG. 13, the thickness t of trailing edge of the blade 1 is inevitably relatively large because the sheet of FRP joins at the trailing edge, and it is difficult to suppress the generation of the Karman vortex street 19 completely.

Even when the rear end part (rear end member or members) of the split-type wind turbine blade is made of hard rubber, the thickness t of trailing edge becomes relatively large and as a result the suppression of the noise due to the generation of said Karman vortex street is difficult, so that, in addition to making the rear end part of hard rubber, said dentation is formed in the trailing edge part 12 to allow vertices rotating about the lines parallel to the wind stream passing the tips and roots of the teeth of the dentation to be generated. These vertices suppress the generation of Karman vortex street, and as a result the noise resulting from Karman vortex street is suppressed.

In the prior art as mentioned above, because the main blade body composing most of the blade is made of FRP and the rear end part made of hard rubber is fixed to the rear end of the main blade body, there are problems to be solved such that it is necessary to provide joining part of the FRP sheet in the vicinity of the trailing edge, and that the blade must inevitably be made large in thickness in consideration of the strength of the blade as a whole, which limits blade performance and suppresses improvement of efficiency of the wind turbine.

When the wind turbine provided with a nacelle is in operation, a blade surface boundary layer 21 is formed between air stream S and the surface of the blade 1, i.e., the upper chord surface 1a and lower chord surface 1b as shown in FIG. 13(B) as a result of the construction that an FRP sheet surrounds the vicinity of the trailing edge part. The blade surface boundary layer 21 influences largely upon the performance of the blade 1. When the thickness $\delta$ of the boundary layer 21 increases, the flow loss due to the development of the boundary layer increases and blade performance is decreased.

The blade surface boundary layer is a thin layer of air developed on the surface of blade due to the viscosity of air, a thin layer from the surface (where the velocity of air relative to the blade surface is zero) to the place where the velocity of air relative to the blade surface is the same or near the relative velocity of the air stream S outside the boundary layer.

The thickness $\delta$ of blade surface boundary layer 21 is given by following Eq (1):

$$\delta = c \cdot L \cdot (1/Re)/5 \qquad (1),$$

where c is a coefficient and its value is about 0.37, L is chord length of the blade, and Re is Reynolds number.

As recognized from above Eq (1), the thickness $\delta$ of boundary layer is proportional to the chord length L.

The thickness $\delta$ of the boundary layer 21 decreases with decreasing chord length L, and blade performance is increased by decreasing chord length L. Therefore, with the blade of the prior art made of FRP in which an FRP sheet surrounds the vicinity of the trailing edge part, there is a limit to the decrease of the thickness $\delta$ of the boundary layer 21.

Therefore, it is desired to provide the blade 1 which allows the formation of the blade surface boundary layer 21 of thickness $\delta$ with which good blade performance can be attained while taking into consideration the strength and output (lift) of the blade 1.

As mentioned before, Karman vortex street 19 is generated and proceeds downstream from the trailing edge 12 as shown in FIG. 13(A), and the noise of frequency proportional to the wind speed is generated in the rear near the trailing edge 12. However, with the blade 1 having rear end member made of hard rubber fixed to the rear end of the main blade body as disclosed in Japanese Patent Application Publication 2000-120524, the strength of the trailing edge part 12 is low compared with that of the main blade body, and it is difficult to provide such a blade which is capable of suppressing the generation of said Karman vortex street 19.

SUMMARY OF THE INVENTION

The present invention was made in light of the problems mentioned above, and an object of the invention is to provide a wind turbine provided with a nacelle, which has blades strong enough for sporadic heavy load, is highly durable and reliable, is capable of being increased in performance by making it possible to reduce blade thickness, and can suppress the generation of the noise due to Karman vortex street.

Another object of the present invention is to provide a wind turbine provided with a nacelle, in which each blade is formed so that the thickness of the boundary layer generated on the chord surface becomes a thickness so as to be able to attain good blade performance.

The present invention was made to attain these objects, and proposes a wind turbine provided with a nacelle mounted on the top end of a support for horizontal revolution, a rotor having a plurality of blades in front of the nacelle being supported for rotation by the nacelle, a rotating force resulting from the lift effected through the pressure difference arising from the difference between the velocities of air stream on the lower chord surface and upper chord surface of the blades, wherein each of blades is a one-piece blade made of one kind of metal or the rear end part of the blade is made of another metal, and the trailing edge part of the blade is formed to have dentation along the length of the blade.

It is suitable that, when the blade is formed of one kind of metal into a one-piece blade, the one-piece blade is made of light metal such as aluminum, titanium, or aluminum alloy including titanium, and when the blade is of a split-type, the main part (main blade body) of the blade excluding the rear end part of the blade is made of one kind of light metal, and the rear end part is made of another metal having higher strength than the metal of the main blade body, e.g., said main blade body is made of aluminum or aluminum alloy, and said rear end part is made of titanium or steel.

Further, when the blade is of a split-type, the main blade body is formed into a hollow one, the rear end part is formed into a solid one, and both are connected by means of riveting or welding.

According to the invention, the blade can be formed into a thin blade as a whole while maintaining the strength of the blade, because the one-piece blade or the main blade body of the split-type blade is made of high-strength metal, preferably aluminum alloy including high-strength aluminum.

Therefore, blade performance can be largely increased resulting in high efficiency of the wind turbine.

The trailing edge of the blade can be reduced to about 2 mm. In addition to this, the generation of Karman vortex street can be completely prevented by forming dentation in the trailing edge part of the blade along the length of the blade, and the noise resulting from the generation of Karman vortex street is positively suppressed.

Further, even if the blade is formed into a thin blade as a whole, the strength of the blade is secured, for the rear end part of the blade is made of high-strength metal such as titanium or steel. Therefore, a thin, lightweight blade which has enough strength for sporadic heavy load which may act on the blade when a gust of wind or earthquake occurs, can be obtained.

Therefore, a blade having a high durability and reliability is provided such that damage of the blade when such a heavy load acts on the blade is evaded.

Further, because the one-piece blade or the main blade body is made of high-strength light metal, a required blade strength can be secured even when the blade or main blade body is made of one kind of metal, and the provision of core members in the blade for reinforcement is not necessary, as is in the case of the conventional blade made of FRP. Accordingly, the structure of the blade 1 is simplified. The blade 1 can be easily manufactured by press working or casting of aluminum alloy, and production man-hours are largely reduced.

Further, as the main blade body and rear end part (rear end member) are made of metals different from each other, it is possible to form the main blade body, which constitutes most of the weight of the blade, out of light metal such as aluminum alloy including aluminum or titanium alloy including titanium, and the rear end member, which constitutes a relatively small percentage of the weight of the blade, out of high-strength steel or titanium alloy which is easy to be formed into thin trailing edge part and also easy to be formed to have the dentation in the trailing edge part. By this, a wind turbine blade can be obtained which can achieve increased blade performance and positively suppress noise resulting from the generation of Karman vortex street.

It is suitable that the blade according to the present invention has a dentation formed in the trailing edge part along the length of the blade, the dentation being formed in a shape of a serration of triangular teeth, of trapezoidal teeth, or of sawteeth, and the ratio of the tooth height h to the thickness $\delta$ of the boundary layer developed on the surface of the blade is:

$h/\delta = 1.0 \sim 10.0$, preferably, $h/\delta = 2.0 \sim 8.0$, and most preferably, $h/\delta = 4.0 \sim 6.0$.

The larger the ratio $h/\delta$ is, the better the effect of noise reduction. However, the values of ratio $h/\delta$ shown above are suitable in view of the meaningful effect on the airfoil characteristic and the strength of the tooth in consideration of the height-and-thickness relation thereof.

It is suitable that the tooth height h decreases toward the outer end of the blade along the length hereof so that said ratio ($h/\delta$) of the tooth height h to the thickness $\delta$ of the boundary layer developed on the surface of the blade is constant along the length of the blade.

It is preferable that the tooth height h is constant along the length of the blade and the chord length L of the blade is decreased toward the outer end of the blade along the length thereof so that the ratio ($h/\delta$) of the tooth height h to the thickness $\delta$ of the boundary layer developed on the surface of the blade increases toward the end of the blade along the length thereof.

According to the present invention, the flow loss resulting from the blade surface boundary layer in the vicinity of the dentation is decreased and the performance of the blade is increased by increasing the ratio ($h/\delta$) of the tooth height h of the dentation to the thickness $\delta$ of the blade surface boundary layer, that is, by increasing the tooth height h of the dentation or by decreasing the thickness $\delta$ of the boundary layer.

However, when the height h of the dentation is increased, the chord length L of the blade must inevitably be increased, so that the blade becomes larger and the thickness $\delta$ of the boundary layer rather increases resulting from the increase of the chord length L.

Although the thickness $\delta$ of the boundary layer decreases when the chord length L is decreased, the strength of the blade decreases and the output (lift F) of the blade also decreases with decreased chord length.

Therefore, according to the present invention, the blade is composed so that the ratio ($h/\delta$) of the tooth height h of the dentation to the thickness $\delta$ of the boundary layer is 1.0~10.0.

When said ratio ($h/\delta$) is smaller than 1.0, the thickness $\delta$ of the boundary layer is large and the flow loss resulting from the boundary layer increases and the performance of the blade decreases. On the other hand, when the ratio ($h/\delta$) is over 10.0, the tooth height h is high and the chord length L must inevitably be increased. As a result, the width of the blade becomes larger, the thickness $\delta$ of the boundary layer rather increases with increased chord length L, and improvement is difficult to be obtained concerning the performance of the blade.

According to the present invention, it becomes possible to attain required blade performance with required blade strength and blade output(lift) secured by composing the blade so that the ratio $h/\delta$ is 1.0~10.0.

Further, according to the present invention, because the tooth height h is decreased toward the outer end of the blade along the length thereof so that the ratio ($h/\delta$) of the tooth height h of the dentation to the thickness $\delta$ of the boundary layer is constant along the length of the blade, the flow loss resulting from the blade surface boundary layer can be suppressed to a constant value along the length of the blade, and the tooth height h can be decreased in proportion to the chord length L along the length of the blade, resulting in a balanced blade strength and output (lift) along the length of the blade.

Still further, according to the present invention, because the tooth height h of the dentation is constant along the length of the blade and the chord length L of the blade is decreased toward the outer end of the blade along the length thereof so that the ratio ($h/\delta$) of the tooth height h to the thickness $\delta$ of the blade surface boundary layer increases toward the outer end of the blade along the length thereof, the flow loss resulting from the blade surface boundary layer is decreased toward the outer end of the blade, where the rotating force obtained from wind force is larger for increased radius from the center of rotation axis of blade, and the blade can achieve high efficiency over the length of the blade with the chord length L of the blade determined to the minimum value for securing the strength of the blade.

According to the present invention, the blade is configured such that the dentation of the trailing edge part along the length of the blade is shaped in a serration of triangular teeth, of trapezoidal teeth, or of sawteeth, and the ratio ($h/p$) of the tooth height h to the pitch p is 0.5~5.0.

When the ratio ($h/p$) of the height h to pitch p of the tooth of the dentation is smaller than 0.5, the tooth height h must be small, the trailing edge of the rear end part approximates a flat trailing edge, and the generation of the longitudinal vortex tubes resulting from the dentation and the consequent effect of suppressing the generation of Karman vortex street cannot be expected.

On the other hand, when the ratio $h/p$ is larger than 5.0, the tooth inevitably becomes slim one with narrow width of root, resulting in decreased strength of the dentention.

Therefore, by shaping the dentation such that the ratio $h/p$ is 0.5~5.0, it becomes possible to suppress the generation of Karman vortex street and positively reduce noise while securing sufficient strength of the dentation.

The ratio $h/p$ is a parameter indicating the degree of protrusion of the tooth of the dentation, which exerts an influence upon the direction of the vortex lines starting from the dentation, and said range of the ratio $h/p$ is most suitable for attaining noise reduction.

The blade as mentioned above is suitable for applying to a large wind turbine provided with a nacelle of which the diameter of the surface of revolution of blades exceeds 10 m and reaches 100 m.

DETAILED DESCRIPTION OF THE PREFERRED EMBODIMENTS

A preferred embodiment of the present invention will now be detailed with reference to the accompanying drawings. It is intended, however, that unless particularly specified, dimensions, materials, relative positions and so forth of the constituent parts in the embodiments shall be interpreted as illustrative only and not as limitative of the scope of the present invention.

Figure 12A:
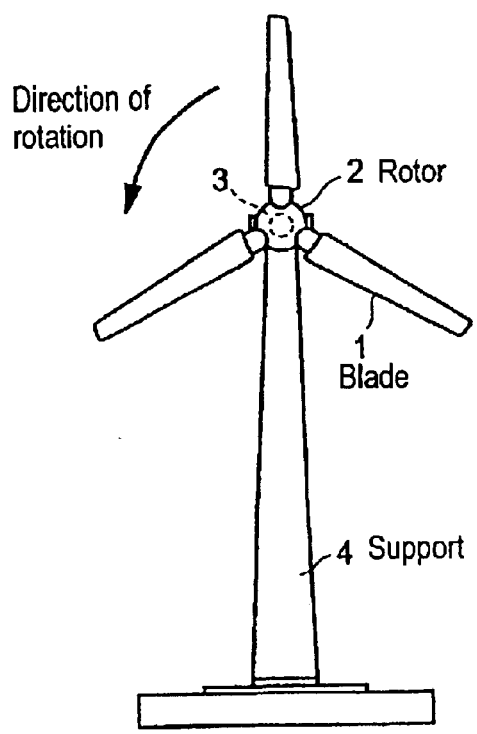
FIG. 12(A) is a front view, and (B) is a side view.
Figure 12B:
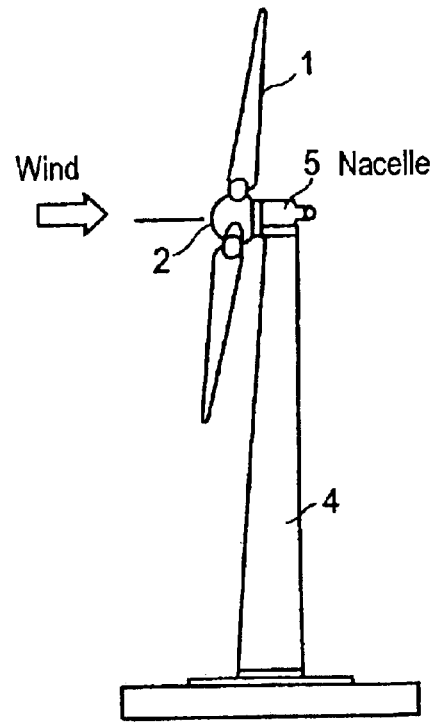
FIG. 12 is a schematic illustration of the wind turbine to which the present invention can be applied.
Figure 13A:
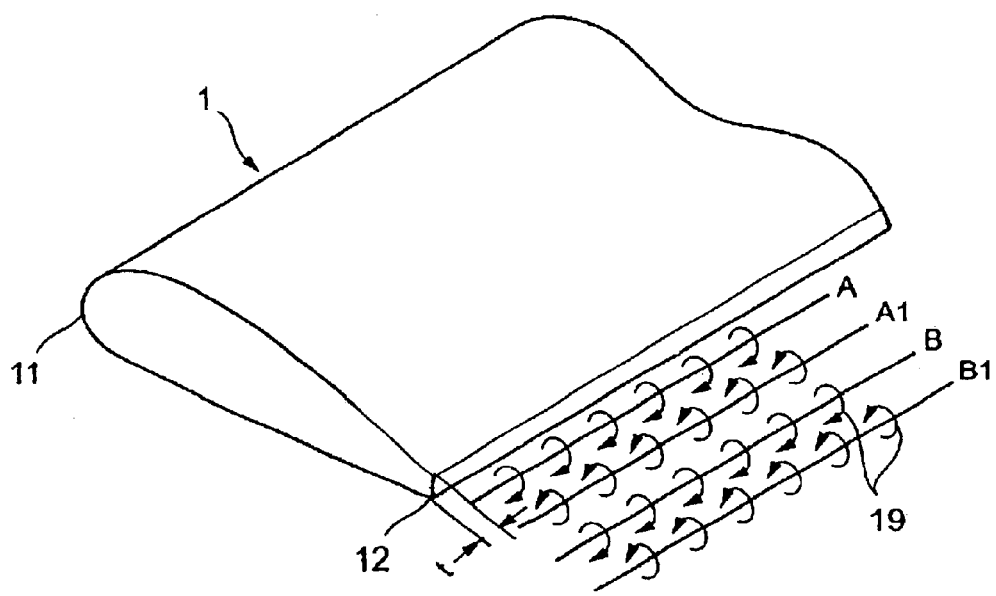
FIG. 13 shows the wind turbine blade of conventional art, (A) is a perspective view, (B) is a sectional view.
FIG. 13(C) is an enlarged plan view of the trailing edge part of the blade.
Figure 13B:
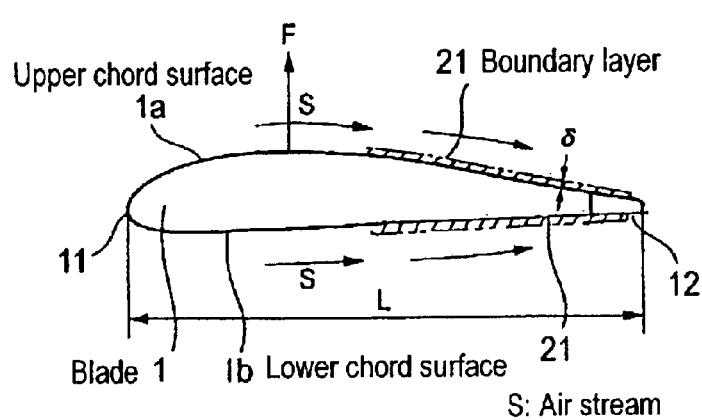
Figure 13C:
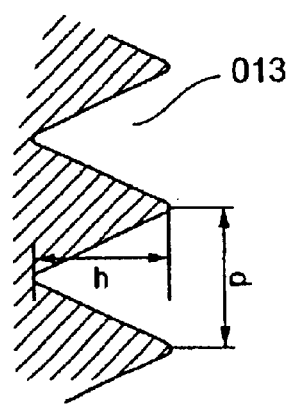

The horizontal-axis wind turbine to which the present invention is applied is composed, as already described referring to FIGS. 12(A) and 12(B) which represent schematically a horizontal-axis wind turbine, such that a nacelle 5 (box for accommodating apparatuses) is mounted on a support 4 for horizontal revolution and the horizontal drive shaft 3 of a rotor 2 having three blades 1 in front of the nacelle 5 is supported by the nacelle 5. The horizontal drive shaft 3 is connected to an electric generator(not shown in the drawing) via a speed increasing gearbox (not shown in the drawing) in the nacelle 5.

The diameter of the surface of revolution of blade of the conventional large horizontal-axis wind turbine reaches nearly 45 m, the wind turbine to which the present invention is applied can be composed to have the diameter of the surface of revolution of blade of 10 m to 100 m, not limited to nearly 45 m, which means that a super large type horizontal-axis wind turbine can be realized by applying the present invention.

The sectional profile of the blade of the wind turbine is of a streamlined one tapered off to the rear edge(trailing edge), which is less subjected to air resistance, and rotating force results from the lift F which is effected through the pressure difference arising from the difference between the velocities of air stream S on the lower chord surface 1b and upper chord surface 1a of the blade 1.

Referring to FIGS. 1 to 3 and FIG. 6 showing the blade profile of the first embodiment of the horizontal-axis wind turbine, the blade 1 is made of high-strength aluminum or aluminum alloy including rolled aluminum alloy or cast aluminum alloy into a single-piece blade. It is suitable to make the blade of high-strength light metal including titanium or titanium alloy.

Figure 6A:
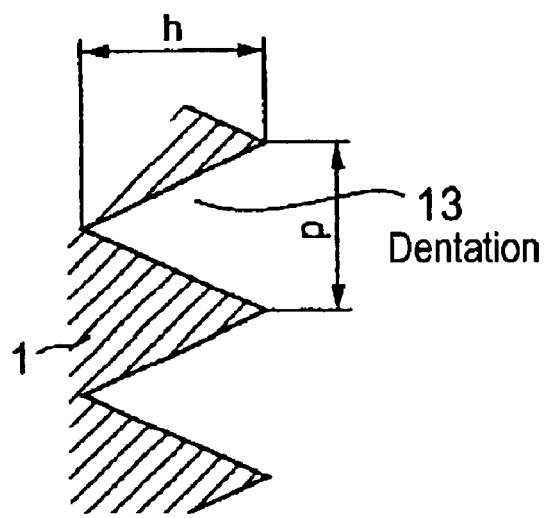
FIG. 6 shows plan views of the rear edge part of blade viewed in the directions of arrow B, C, and E of FIG. 2, 3, and 5, FIG. 6(A) showing triangular tooth shaped rear edge part, FIG. 6(B) showing trapezoid tooth shaped rear edge part.
Figure 6B:
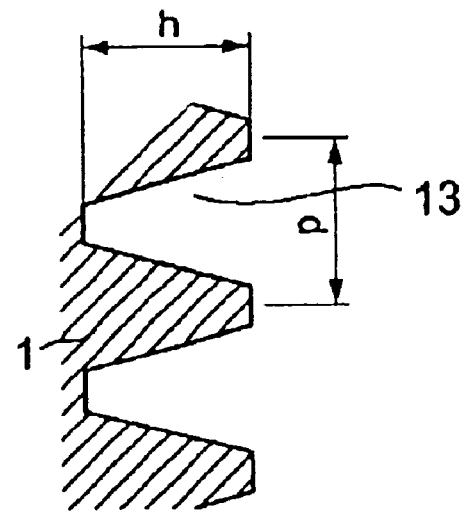

Reference numeral 11 is the leading edge part, 12 is the trailing edge part. In the trailing edge part 12 is formed a dentation 13 along the length of the blade 1. The dentation 13 is formed in the shape of serration of triangular protrusions as shown in FIG. 6(A) or serration of trapezoidal protrusions as shown in FIG. 6(B). The pitch p and height h of the teeth are determined in relation to the thickness t of the trailing edge of the trailing edge part 12 so that the generation of Karman vortex street is kept to a minimum. The shape of the dentation 13 is not limited to said serration of triangular protrusions or trapezoidal protrusions, and any dentations which suppress the generation of Karman vortex street are suitable.

Figure 2:
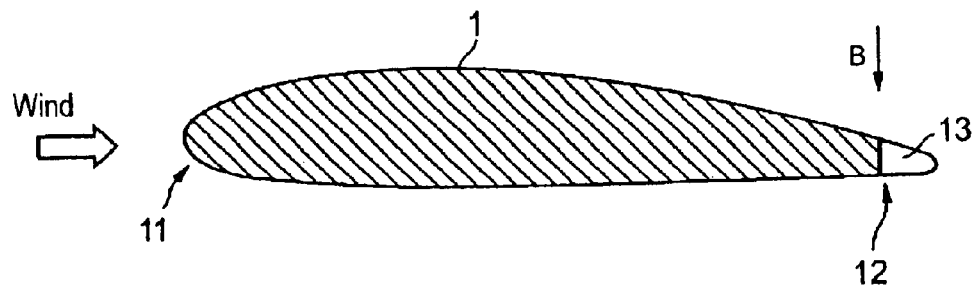
FIG. 2 is sectional view along line A—A of FIG. 1 when the blade is formed into a solid one.
Figure 3:
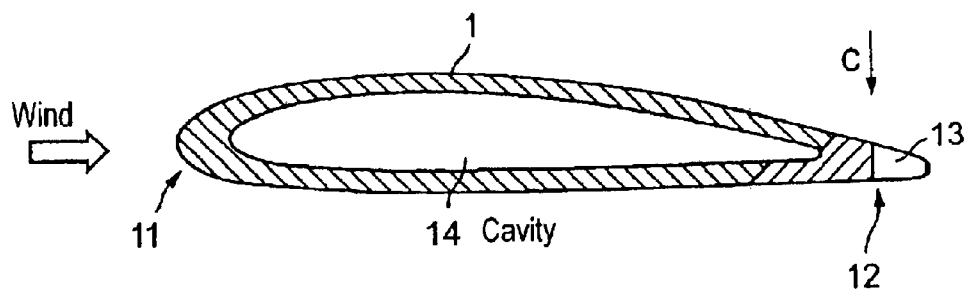
FIG. 3 is a sectional view along line A—A of FIG. 1 when the blade is formed into a hollow one.

The blade 1 may be formed into a solid, one-piece blade as shown in FIG. 2, or into a hollow, one-piece blade as shown in FIG. 3, in which reference numeral 14 denotes the cavity, for the reduction of weight.

According to the first embodiment, the blade 1 is made of light, high-strength metal such as aluminum alloy including high-strength aluminum, and formed into a one-piece blade, so that the blade can be formed into a thin blade for reducing air resistance while securing enough strength of the blade. Therefore, the performance of the blade 1 can be largely improved by reducing the thickness of the blade and increased efficiency of the wind turbine can be attained.

Because the blade 1 is made of metal such as high-strength alloy, the thickness of the trailing edge part 12 of the blade 1 can be reduced to a minimum (about 2 mm) without problems.

Figure 1:
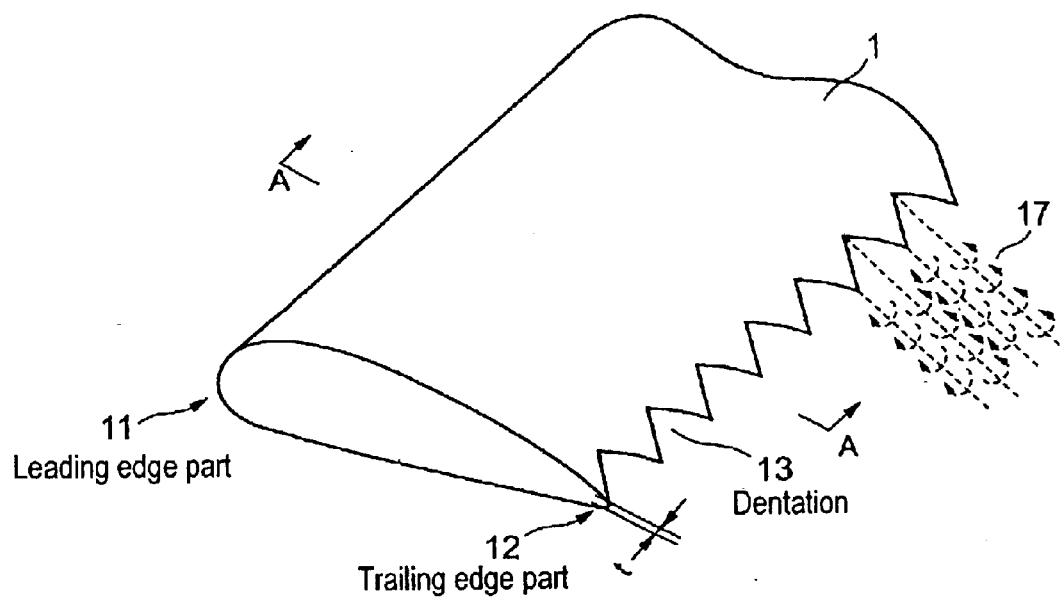
FIG. 1 is a perspective view of the wind turbine blade of the first embodiment of the present invention.

In addition to this, it becomes possible to form the dentation 13 in the trailing edge part 12 along the length of the blade. The dentation 13 induces the generation of non-periodic vortices 17 rotating about the longitudinal lines parallel to the direction of wind and passing the tips and roots of the teeth as shown in FIG. 1, and these vortexes 17 interfere with the generation of Karman vortex street resulting in the suppression of the noise induced by Karman vortex street.

Therefore, by forming the trailing edge part 12 of the blade 1 to be thin to a minimum thickness(about 2 mm) without affecting the strength of the blade 1 and by forming the detention 13 in the trailing edge part 12, the generation of Karman vortex street downstream from the trailing edge 12 is completely prevented and noise resulting from the Karman vortex street can be positively suppressed.

Further, because the blade 1 is formed into one-piece out of high-strength metal such as aluminum alloy or titanium alloy, the blade 1 can be made to have high strength even if it is formed into a thin blade profile. Therefore, the blade 1 can be made light in weight, strength enough for sporadic heavy load to the blade due to a gust of wind or earth quake can be secured by the thin, lightweight blade, and damage to the blade 1 when such heavy load acts on the blade is prevented.

Further, because the blade 1 is made of light and high-strength metal, required blade strength can be secured even by the one-piece blade made of one kind of metal, and the provision of core members in the blade for reinforcement is not necessary as is with the conventional blade of FRP. Accordingly, the structure of the blade 1 is simplified. The blade 1 can be easily manufactured by press working or casting of aluminum alloy, and production man-hours are greatly reduced.

Figure 4:
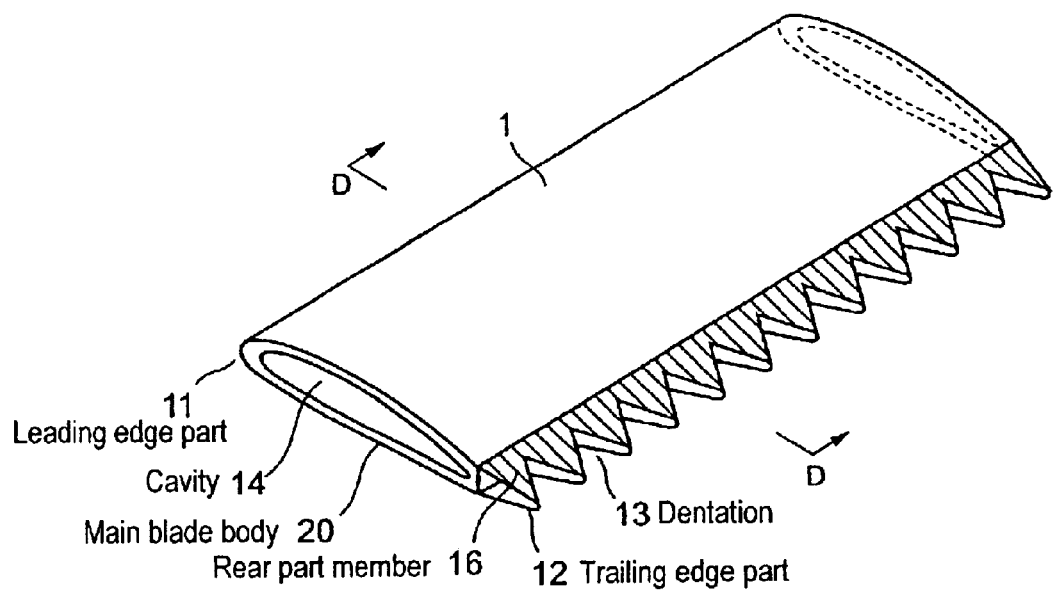
FIG. 4 is a perspective view of the wind turbine blade of the second embodiment of the present invention.
Figure 5:
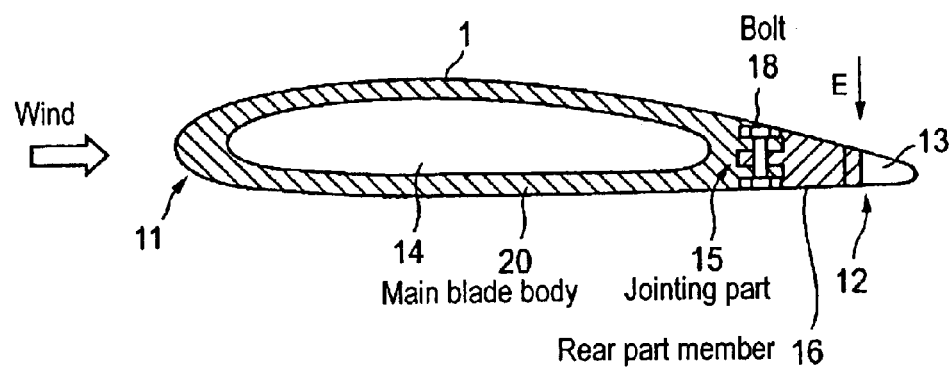
FIG. 5 is a sectional view along line D—D of FIG. 4 when the blade is formed into a hollow one.

According to the second embodiment shown in FIGS. 4 and 5, the blade is composed such that the main body excluding the rear end part of the blade is formed into one-piece out of one kind of high-strength metal such as aluminum alloy or titanium alloy, and the rear part member 16 made of metal such as titanium alloy or steel which is different from the material of the main blade body 20 is fixed to the main blade body.

In the drawings, the blade 1 consists of the main blade body 20 made of aluminum alloy or titanium alloy the same as the case of the first embodiment and the rear part member 16 made of metal such as titanium alloy or steel, the rear part member 16 being connected to the to the main blade body 20. Reference numeral 11 is the leading edge part, and 12 is the trailing edge part of the blade 1.

When the rear part member 16 is made of steel, it can not be welded directly to the main blade body 20 of aluminum alloy, and the rear part member 16 is fitted to the main blade body in a socket-and-spigot joint and the both are tightened with a plurality of bolts 18 along the length of the blade as shown in FIG. 5 as a jointing part 15. Filling material is potted in the recesses around the bolt ends to form smooth surfaces of the recesses coinciding with the chord surface of the blade.

When both the main blade body 20 and rear part member 16 are made of materials capable of being welded, for example, the both are made of titanium alloy, then both may be connected by welding.

In the trailing edge part 12 of the rear part member 16 is formed a continuous dentation 13 along the length of the blade similarly as in the case with the first embodiment. The dentation 13 may be formed in the shape of a serration of triangular protrusions as shown in FIG. 6(A) or a serration of trapezoidal protrusions as shown in FIG. 6(B), similarly as is the case with the first embodiment. The pitch p and height h of the teeth are determined in relation to the thickness t of the trailing edge so that the generation of Karman vortex street is minimum. The main blade body 20 may be a solid one as shown in FIG. 5 or a hollow one (reference numeral 14 denotes the cavity) as shown in FIG. 2.

According to the second embodiment, the combination of materials of the main blade body and rear end part can be arbitrarily determined. Therefore, by forming the main blade body, which constitute most of the weight of the blade, out of light metal such as aluminum alloy including aluminum and titanium alloy including titanium, and forming the rear end part, which constitutes a relatively small percentage of the weight of the blade, out of high-strength steel or titanium alloy which is easy to be formed into a thin trailing edge part and also easy to be formed to have dentation, the performance of the blade 1 is largely increased and the noise resulting from the generation of Karman vortex street can positively suppressed.

Figure 7:
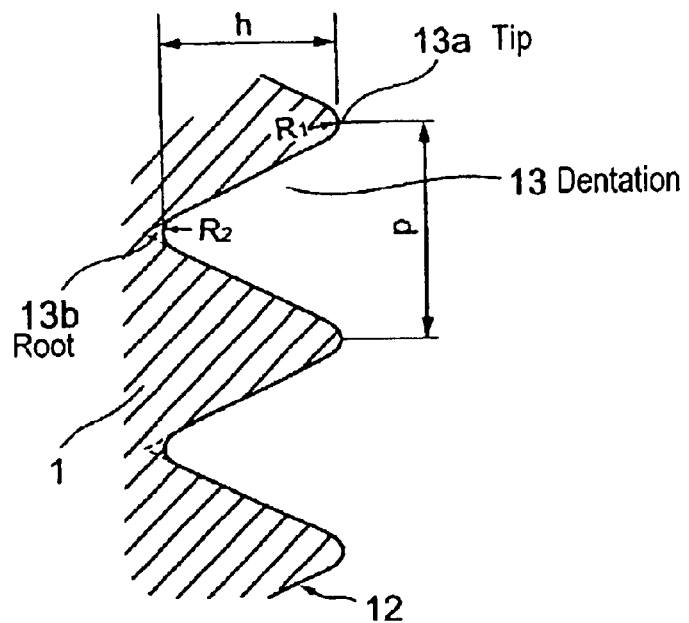
FIG. 7 is an enlarged plan view of the rear end part of blade of the third embodiment of the present invention.

According to the third embodiment shown in FIG. 7, the blade 1 has a trailing edge part 12 serrated in the shape of triangular teeth continuously along the length of the blade.

Figure 8:
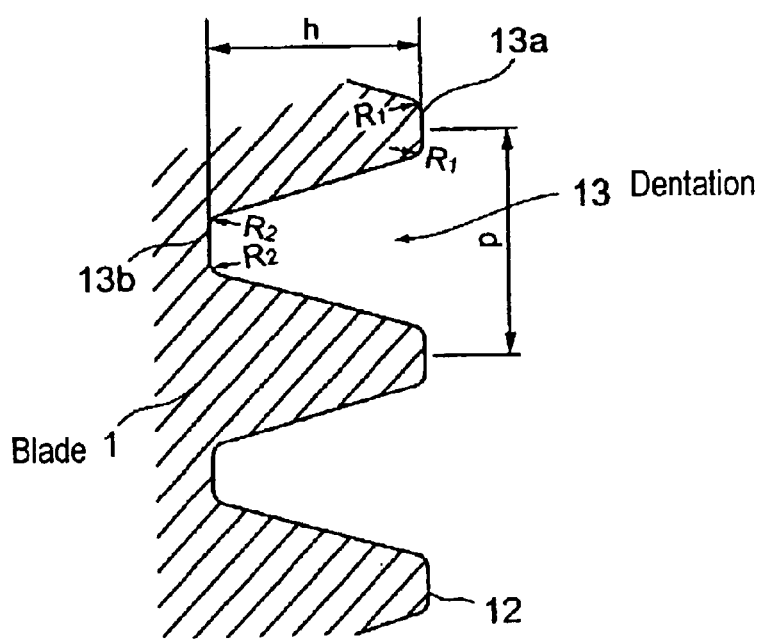
FIG. 8 is an enlarged plan view of the rear end part of blade of the fourth embodiment of the present invention.

According to the fourth embodiment shown in FIG. 8, the blade 1 has a trailing edge part 12 serrated in the shape of trapezoidal teeth continuously along the length of the blade.

In said third and fourth embodiments, the relations between the height h and pitch p of the tooth, and the thickness $\delta$ of the boundary layer 21 on the chord surface of the blade given by Eq. (1) are determined as follows:

The ratio ($h/\delta$) of the tooth height h to the thickness $\delta$ of the boundary layer is $$h/\delta = 1.0 \sim 10.0 \quad (2),$$

preferably, $h/\delta = 2.0 \sim 8.0$, and
most preferably, $h/\delta = 4.0 \sim 6.0$.

The thickness $\delta$ of the boundary layer 21 is given by Eq. (1) shown before, which is rewritten here $$\delta = c \cdot L \cdot (1/Re)/5 \quad (1),$$

where c is a coefficient and its value is about 0.37.

The ratio ($h/p$) of the height h to pitch p of the tooth is $$h/p = 0.5 \sim 5.0 \quad (3),$$

preferably, $h/p = 0.6 \sim 3.0$, and
most preferably, $h/p = 0.8 \sim 1.5$.

Further, the tip 13a of the triangular tooth of the third embodiment of FIG. 7 and the corner 13a of the trapezoid tooth of the fourth embodiment of FIG. 8 are rounded by radius R1. The root or the corners of the root 13b of the tooth are rounded by radius R2. The corner and fillet radii RI and R2 preferably do not exceed 10% of the tooth height h.

Figure 11:
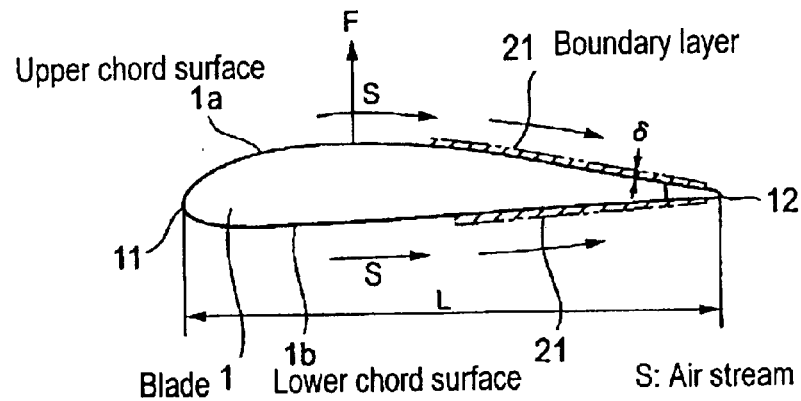
FIG. 11 is an illustration for explaining the working of the blade to which the present invention is applied.

When the wind turbines provided with the blades 1 according to the third and fourth embodiments are operated, a blade surface boundary layer 21 is formed between air stream S and the surface of the blade 1, i.e., the upper chord surface 1a and lower chord surface 1b, as shown in FIG. 11.

Flow loss resulting from the blade surface boundary layer 21 decreases as the thickness $\delta$ of the blade surface boundary layer 21 decreases resulting in increased performance of the blade 1. The thickness $\delta$ of the boundary layer 21 increases in proportion to the chord length L of the blade as recognized by Eq. (1).

In the blade with dentation 13 formed in the trailing edge part 12 of the third and fourth embodiment, the flow loss in the vicinity of the dentation 13 is decreased and the performance of the blade is increased by increasing the ratio ($h/\delta$) of the tooth height h of the dentation to the thickness $\delta$ of the boundary layer 21 on the upper chord surface 1a and lower chord surface 1b, that is, by increasing the tooth height h of the dentation or by decreasing the thickness $\delta$ of the boundary layer 21.

However, when the height h of the dentation 13 is increased, the chord length L of the blade 1 must inevitably be increased, so that the blade 1 becomes larger in width and the thickness $\delta$ of the boundary layer 21 rather increases due to the increase of the chord length L.

Although the thickness $\delta$ of the boundary layer 21 decreases when the chord length L is decreased, the strength of the blade decreases and the output (lift F) of the blade 1 also decreases with decrease chord length.

According to the third and fourth embodiments, the blade 1 is configured so that the ratio ($h/\delta$) of the tooth height h of the dentation to the thickness $\delta$ of the boundary layer 21 on the upper chord surface 1a and lower chord face 1b is $1.0 \sim 10.0$.

When the ratio ($h/\delta$) is smaller than 1.0, the thickness $\delta$ of the boundary layer 21 becomes thicker, the flow loss resulting from the boundary layer 21 increases, and the performance of the blade 1 decreases. When the ratio (h/δ) is over 10.0, the tooth height h is high and the chord length L must inevitably be increased. As a result, the blade 1 becomes larger, the thickness δ of the boundary layer 21 rather increases with increased chord length, and improvement is difficult to be obtained concerning the performance of the blade 1.

According to the embodiments, it becomes possible to suppress the thickness of the blade surface boundary layer 21 and attain required blade performance with required blade strength and blade output (lift) secured by configuring the blade so that the ratio h/δ is 1.0~10.0.

Further, by forming the dentation 13 in the trailing edge part 12 of the blade 1 along the length thereof, non-periodic vortices 17 rotating about the longitudinal lines parallel to the direction of wind and passing the tips 13a and roots 13b of the dentation 13 (longitudinal vortex tubes) are generated as shown in FIG. 1 under the operation of the wind turbine provided with a nacelle. The vortices 17 interfere with the generation of Karman vortex street and the noise resulting from the Karman vortex street is suppressed.

However, in the third and fourth embodiments, when the ratio (h/p) of the height h to pitch p of the tooth of the dentation 13 is smaller than 0.5, the tooth height h must be small, the trailing edge of the trailing edge part 12 approximates a flat trailing edge, and the generation of the vortex tube 17 generated resulting from the dentation and the consequent effect of suppressing the generation of Karman vortex street cannot be expected.

On the other hand, when the ratio h/p is over 5.0, the tooth height h is excessive compared with the pitch p, and the tooth must becomes a slim one with a narrow width of root, resulting in decreased strength of the dentention 13.

According to the third and fourth embodiments, it is possible to suppress the generation of Karman vortex street and positively reduce noise while securing enough strength of the dentation 13 through configuring the dentation 13 such that h/p=0.5~5.0 as in Eq. (3).

Figure 9:
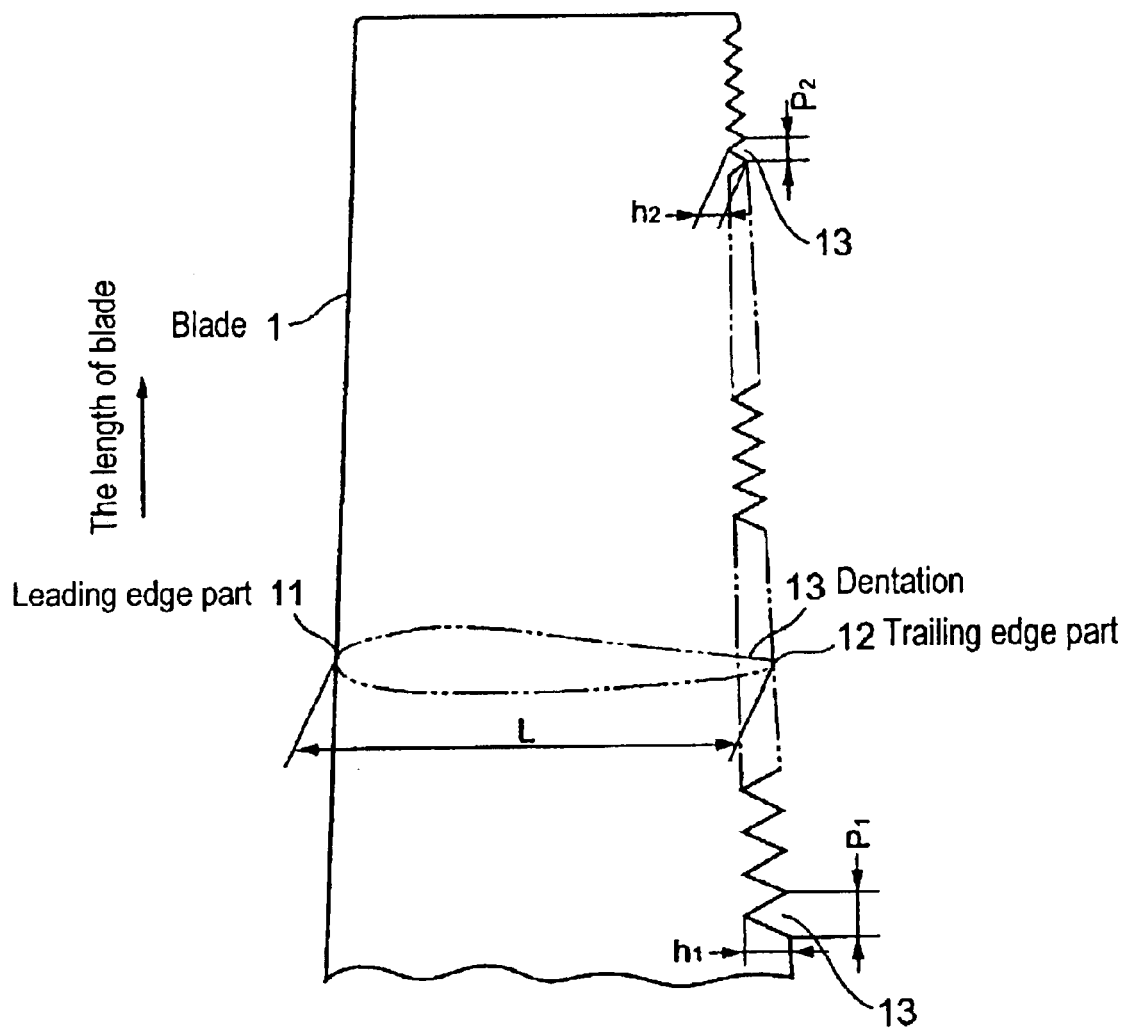
FIG. 9 is a plan view of the blade of the fifth embodiment of the present invention.

In the fifth embodiment shown in FIG. 9, the tooth height h is varied along the length of the blade so that the ratio (h/δ) of the tooth height h of the dentation 13 to the thickness δ of the boundary layer 21 on the upper and lower chord surface 1a, 1b is constant along the length of the blade. In FIG. 9, reference numeral 11 is the leading edge part, and 12 is the trailing edge part of the blade 1. Letter L indicates the chord length which is reduced toward the outer end of the blade 1.

To be more specific, the tooth height h and pitch p of the dentation 13 are determined such that, the tooth height and pitch are h1, and p1 respectively in the vicinity of the root of the blade 1 and those in the vicinity of the outer end of the blade 1 are h2 and p2, respectively, the tooth height and pitch are decreased toward the outer end of the blade 1 along the length thereof with the chord length decreasing toward the outer end of the blade 1 along the length thereof so that the ratio h/δ is constant along the length of the blade 1, and at the same time the ratio h/δ suffices Eq. 2 (h/δ=1.0~10.0).

According to the fifth embodiment, because the tooth height h is decreased toward the outer end of the blade along the length thereof so that the ratio (h/δ) of the tooth height h of the dentation 13 to the thickness δ of the boundary layer 21 on the upper and lower chord surface 1a, 1b is constant along the length of the blade 1, the flow loss resulting from the blade surface boundary layer 21 can be suppressed to a constant value along the length of the blade 1.

Further, as the tooth height h is decreased in proportion to the chord length L along the length of the blade 1, a balanced blade strength and output (lift) along the length of the blade 1 is attainable.

Figure 10:
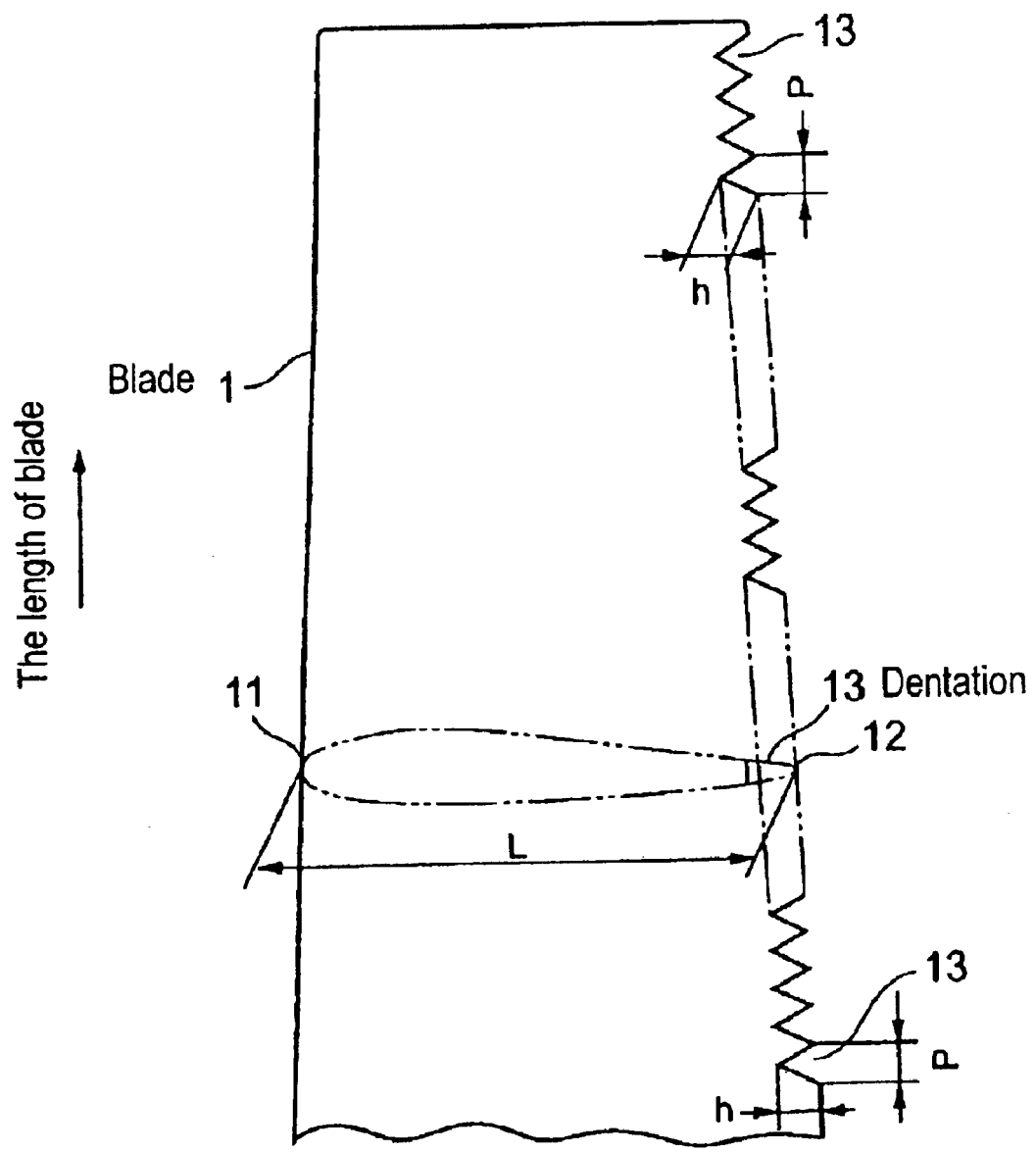
FIG. 10 is a plan view of the blade of another example of the sixth embodiment of the present invention.

In the sixth embodiment shown in FIG. 10, the tooth height h and pitch p of the dentation 13 are constant along the length of the blade, and the chord length L of the blade 1 is decreased toward the outer end of the blade 1 along the length thereof so that the ratio (h/δ) of the tooth height h of the dentation 13 to the thickness δ of the boundary layer 21 on the upper and lower chord surface 1a, 1b increases toward the outer end of the blade 1 along the length thereof. In FIG. 10, reference numeral 11 is the leading edge part, 12 is the trailing edge part of the blade 1.

The tooth height of the dentation is determined so that the ratio h/δ suffices Eq. (2), which is h/δ=1.0~10.0.

According to the sixth embodiment, the tooth height h of the dentation 13 is constant along the length of the blade and the chord length L of the blade is decreased toward the outer end of the blade along the length thereof so that the ratio (h/δ) of the tooth height h to the thickness δ of the blade surface boundary layer 21 increases toward the outer end of the blade along the length thereof, so the flow loss resulting from the blade surface boundary layer is decreased toward the outer end of the blade, where the rotating force obtained from wind force is larger for increased radius from the center of rotation axis of blade.

Therefore, the blade can achieve high efficiency over the length of the blade 1 with the chord length L of the blade determined to the minimum value for securing the strength of the blade 1.

As described in the foregoing, according to the present invention, because a one-piece blade or the main blade body of a split-type blade is made of light weight, high-strength metal, preferably aluminum alloy including high strength aluminum, the blade can be formed into a thin blade while maintaining the strength thereof.

Therefore, high-efficiency wind turbine can be realized, for the performance of blade can be largely increased by forming the blade to be thinner and smaller. Further, the thickness of the trailing edge of blade can be decreased to a minimum value (about 2 mm) by making the main blade body of high-strength metal, and in addition, through forming dentation in the trailing edge part along the length of the blade, the generation of Karman vortex street downstream from the trailing edge is completely prevented. As a result, noise resulting from the generation of Karman vortex street can be positively suppressed.

Further, according to the present invention, a thin blade of high strength, which is light in weight and has sufficient strength for a sporadic heavy load acting on the blade in case a gust of wind or earthquake occurs, and the blade having high durability and reliability despite its decreased thickness can be provided, with which the damage of blade when heavy load acts on the blade is evaded.

Still further, the required strength of the blade can be secured even when the blade is made of one kind of metal. Accordingly, the structure of the blade is simplified, the blade can be easily manufactured, and production man-hours are largely reduced.

When the blade is composed to be a split-type, the combination of materials of the main blade body and rear end part can be arbitrarily determined. Therefore, by forming the main blade body out of light metal such as aluminum alloy and titanium alloy, and forming the rear end part, which constitutes a relatively small percentage of the weight of the blade, out of high-strength steel or titanium alloy which is easy to be formed into thin trailing edge part and also easy to be formed to have dentation 13, the wind turbine blade can be provided with its performance largely improved and the noise resulting from the generation of Karman vortex street positively suppressed.

The flow loss in the vicinity of the dentation is decreased and the blade performance is increased by increasing the ratio (h/δ) of the tooth height h of the dentation to the thickness δ of the boundary layer. On the other hand, however, when the height h of the dentation is increased, the chord length L of the blade must inevitably be increased, so that the blade becomes larger in width and the thickness δ of the boundary layer rather increases due to the increase of the chord length L. In light of this point, according to the present invention, it becomes possible to attain required blade performance and output while evading the necessity of increasing the width of blade through limiting the increase of the thickness δ of the boundary layer by configuring the blade so that the ratio (h/δ) of the tooth height h of the dentation to the thickness δ of the boundary layer is 1.0~10.0.

Further, according to the present invention, because the tooth height h is decreased toward the outer end of the blade along the length thereof so that the ratio (h/δ) of the tooth height h of the dentation to the thickness δ of the boundary layer is constant along the length of the blade, the flow loss resulting from the blade surface boundary layer can be suppressed to a constant value along the length of the blade, and the tooth height h is decreased in proportion to the chord length L along the length of the blade resulting in a balanced blade strength and output (lift) along the length of the blade.

Still further, according to the present invention, because the tooth height h of the dentation is constant along the length of the blade and the chord length L of the blade is decreased toward the outer end of the blade along the length thereof so that the ratio (h/δ) of the tooth height h to the thickness δ of the blade surface boundary layer increases toward the outer end of the blade along the length thereof, so the flow loss due to the blade surface boundary layer is decreased toward the outer end of the blade, where the rotating force obtained from wind force is larger for increased radius, and the blade can achieve high efficiency over the length of the blade with the chord length L of the blade determined to the minimum value for securing the strength of the blade.

Yet further, according to the present invention, by forming the dentation, the serration of triangular teeth or of trapezoidal teeth, in the trailing edge part of the blade along the length thereof, non-periodic vortices rotating about the longitudinal lines parallel to the direction of wind and passing the tips and roots of the teeth are generated under the operation of the wind turbine. The vortices interfere with the generation of Karman vortex street, and the noise resulting from the Karman vortex street is suppressed.

When the ratio (h/p) of the height h to pitch p of the tooth of the dentation is small, the tooth height h must be small, the trailing edge of the trailing edge part approximates a flat trailing edge, and the generation of the longitudinal vortex tubes resulting from the dentation and the consequent effect of suppressing the generation of Karman vortex street cannot be expected.

On the other hand, when the ratio h/p is large, the tooth inevitably becomes slim with a narrow width of root, resulting in decreased strength of the dentention. In light of this point, according to the present invention, it becomes possible to suppress the generation of Karman vortex street and positively reduce noise while securing enough strength of the dentation through shaping the dentation such that h/p is 0.5~5.0.

As described above, according to the present invention, a wind turbine blade can be provided, which has a strength strong enough for sporadic heavy load, has high durability and reliability, is capable of being formed into a thin blade. As a result, wind turbine performance can be increased, the noise due to the generation of Karman vortex street can be suppressed, and further blade structure is simplified resulting in the reduction of blade production man-hours.

What is claimed is:

1. A wind turbine provided with a nacelle mounted on the top end of a support for horizontal revolution, and a rotor having a plurality of blades in front of the nacelle being supported for rotation by the nacelle, rotating force resulting from the lift effected through the pressure difference arising from the difference between the velocities of air stream on the lower chord surface and upper chord surface of the blades, wherein each of said blades is a one-piece blade made of one kind of metal or the rear end part of the blade is made of another metal, and the trailing edge part of the blade is formed to have dentation along the length of the blade, and wherein when said blade is formed of one kind of metal into one-piece, the one-piece blade is made of light metal selected from the group consisting of aluminum, titanium, and aluminum alloy including titanium.

2. A wind turbine provided with a nacelle mounted on the top end of a support for horizontal revolution, and a rotor having a plurality of blades in front of the nacelle being supported for rotation by the nacelle, rotating force resulting from the lift effected through the pressure difference arising from the difference between the velocities of air stream on the lower chord surface and upper chord surface of the blades, wherein each of said blades is a one-piece blade made of one kind of metal or the rear end part of the blade is made of another metal, and the trailing edge part of the blade is formed to have dentation along the length of the blade, and wherein a main blade body of said blade excluding the rear end part of the blade is made of one kind of light metal, and the rear end part is made of another metal having a greater strength than the metal of said main blade body.

3. The wind turbine provided with a nacelle according to claim 2, wherein said main blade body is made of aluminum or aluminum alloy, and said rear end part is made of titanium or steel.

4. The wind turbine provided with a nacelle according to claim 2, wherein said main blade body is formed into a hollow one, said rear end part is formed into a solid one, and both said main blade body and said rear end part are connected by means of rivets or by welding.

5. The wind turbine provided with a nacelle according to claim 1, wherein said dentation of the trailing edge part along the length of the blade is shaped in a serration of triangular teeth, of trapezoidal teeth, or of sawteeth, and the ratio of the tooth height h to the thickness δ of the boundary layer developed on the surface of the blade is:

$$h/δ=1.0~10.0.$$

6. The wind turbine provided with a nacelle according to claim 5, wherein the tooth height h decreases toward the outer end of the blade along the length thereof so that said ratio h/δ of the tooth height h to the thickness δ of the boundary layer developed on the surface of the blade is constant along the length of the blade.

7. The wind turbine provided with a nacelle according to claim 5, wherein the tooth height h is constant along the length of the blade and the chord length L of the blade is decreased toward the outer end of the blade along the length thereof so that said ratio h/δ of the tooth height h to the thickness δ of the boundary layer developed on the surface of the blade increases toward the outer end of the blade along the length of the blade.

8. The wind turbine provided with a nacelle according to claim 1, wherein said dentation of the trailing edge part along the length of the blade is shaped in a serration of triangular teeth, of trapezoidal teeth, or of sawteeth, and the ratio of the tooth height h to the pitch p is:

$h/p = 0.5 \sim 5.0.$

9. The wind turbine provided with a nacelle according to claim 1, wherein the wind turbine is a large one having the surface of revolution of the blade of 10 m to 100 m.

10. The wind turbine provided with a nacelle according to claim 2, wherein said dentation of the trailing edge part along the length of the blade is shaped in a serration of triangular teeth, of trapezoidal teeth, or of sawteeth, and the ratio of the tooth height h to the thickness δ of the boundary layer developed on the surface of the blade is:

$h/\delta = 1.0 \sim 10.0.$

11. The wind turbine provided with a nacelle according to claim 10, wherein the tooth height h decreases toward the outer end of the blade along the length thereof so that said ratio h/δ of the tooth height h to the thickness δ of the boundary layer developed on the surface of the blade is constant along the length of the blade.

12. The wind turbine provided with a nacelle according to claim 10, wherein the tooth height h is constant along the length of the blade and the chord length L of the blade is decreased toward the outer end of the blade along the length thereof so that said ratio h/δ of the tooth height h to the thickness δ of the boundary layer developed on the surface of the blade increases toward the outer end of the blade along the length of the blade.

13. The wind turbine provided with a nacelle according to claim 2, wherein said dentation of the trailing edge part along the length of the blade is shaped in a serration of triangular teeth, of trapezoidal teeth, or of sawteeth, and the ratio of the tooth height h to the pitch p is:

$h/p = 0.5 \sim 5.0.$

14. The wind turbine provided with a nacelle according to claim 2, wherein the wind turbine is a large on having the surface of revolution of the blade of 10 m to 100 m.

* * * * *